Patented Feb. 20, 1934

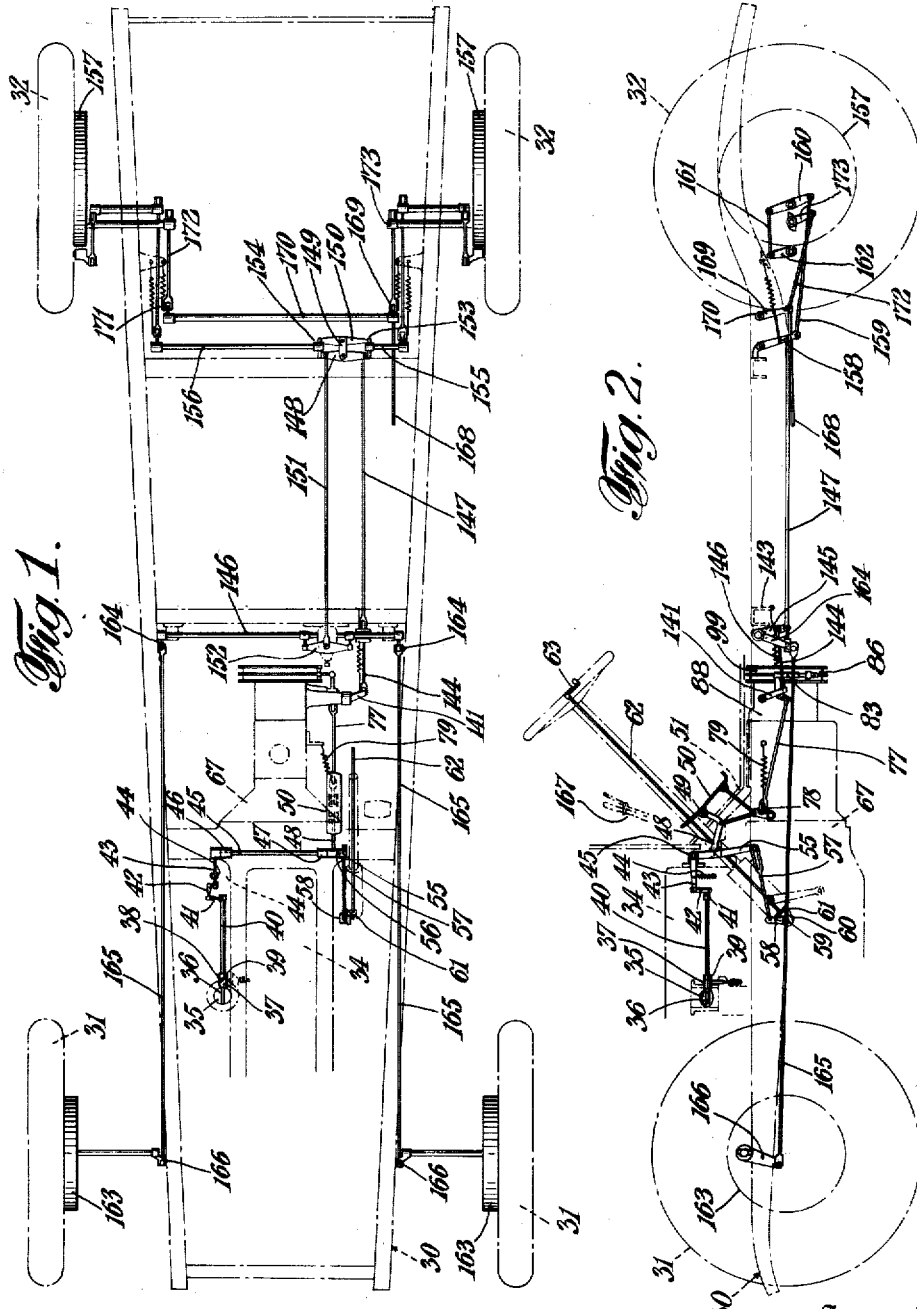

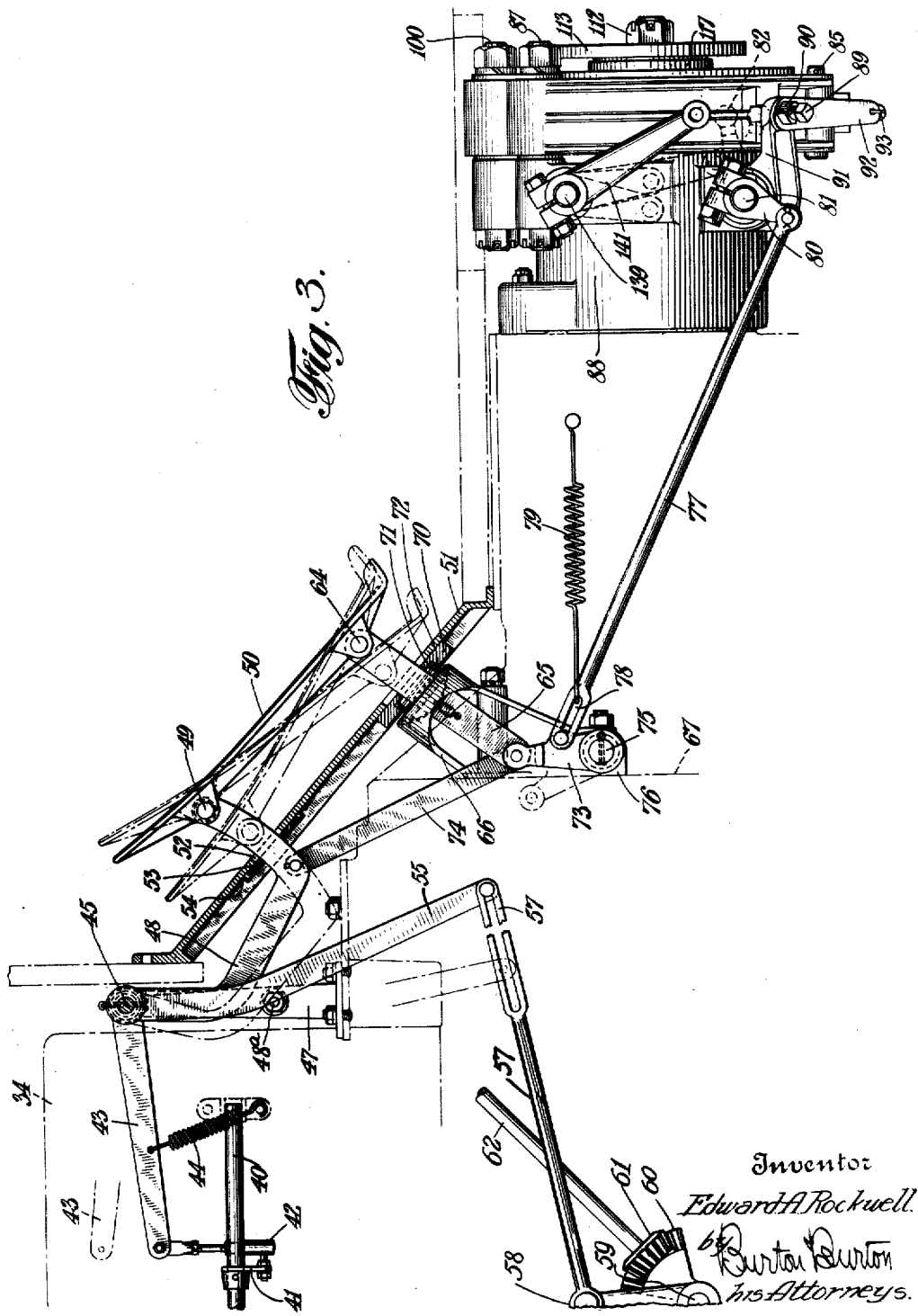

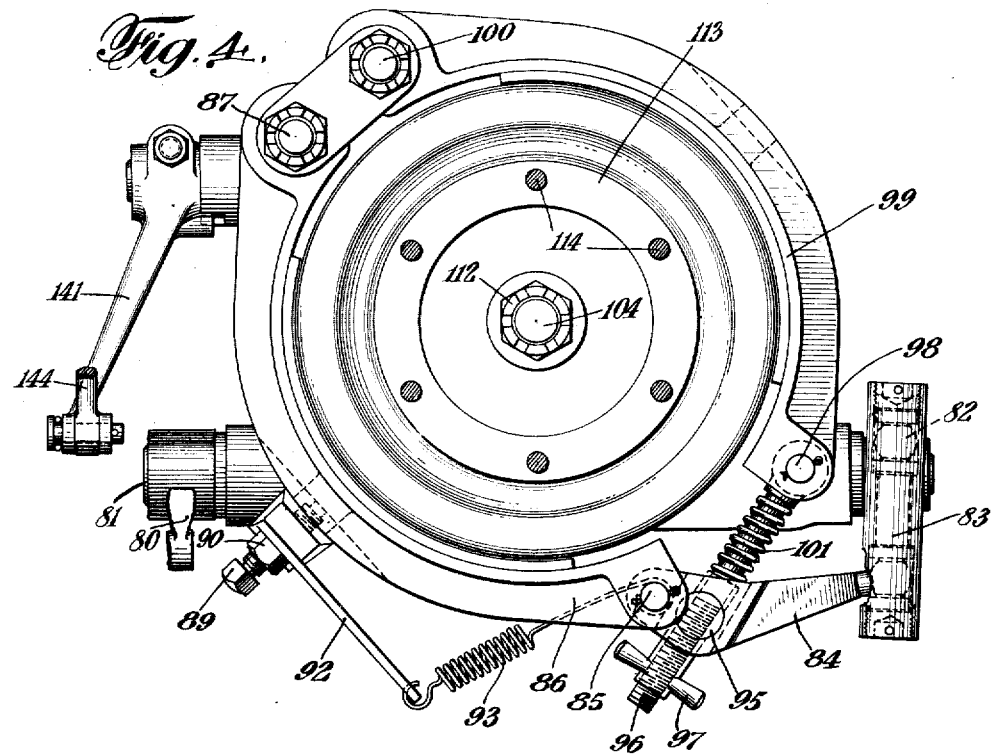
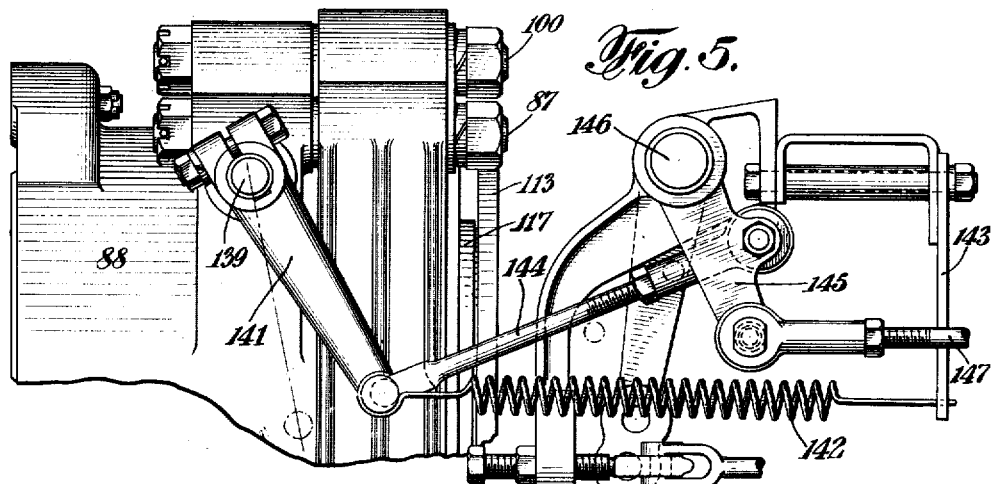

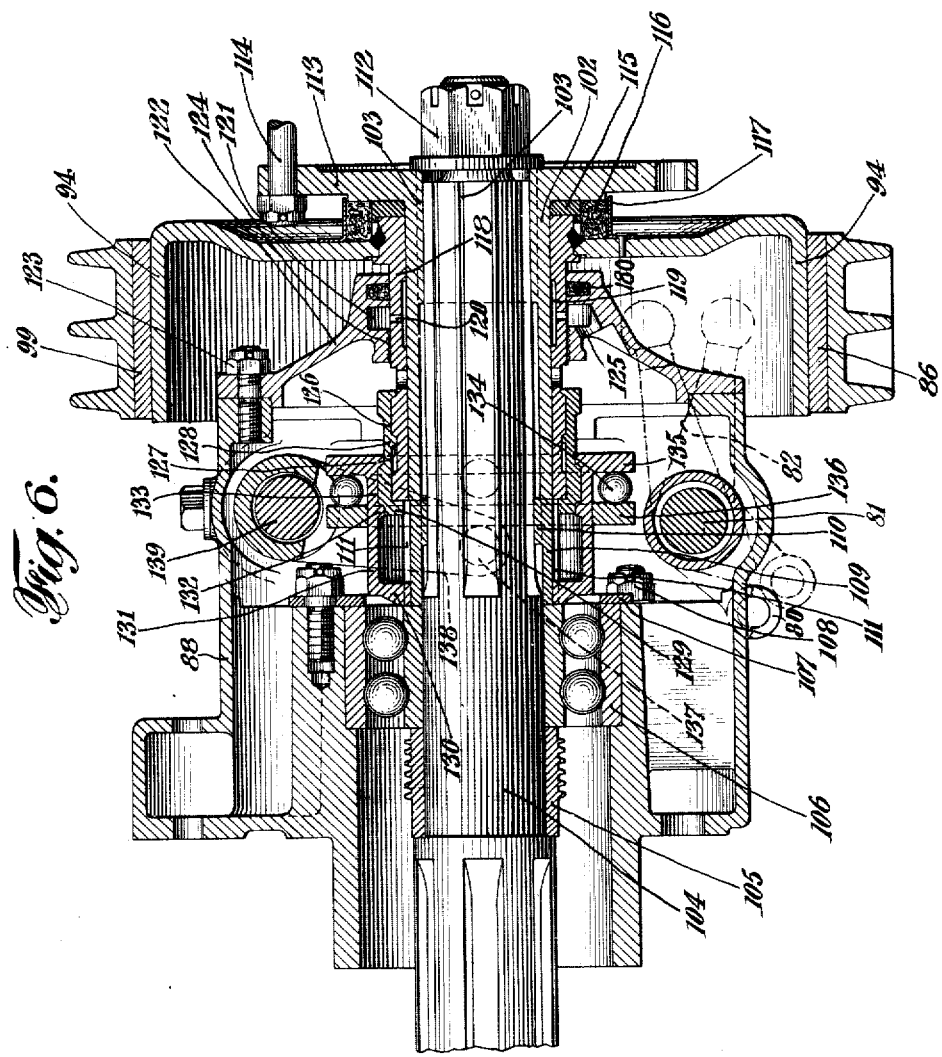

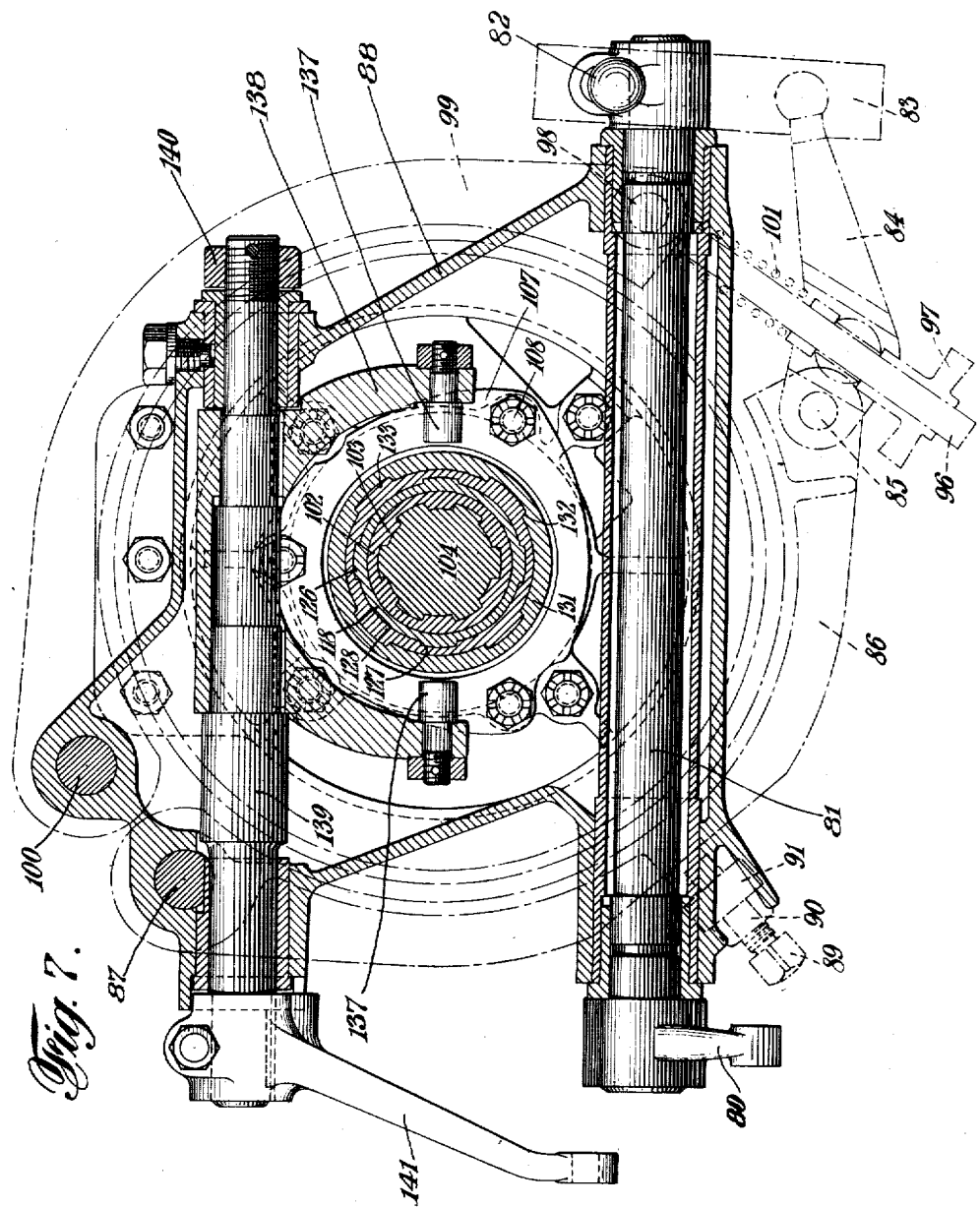

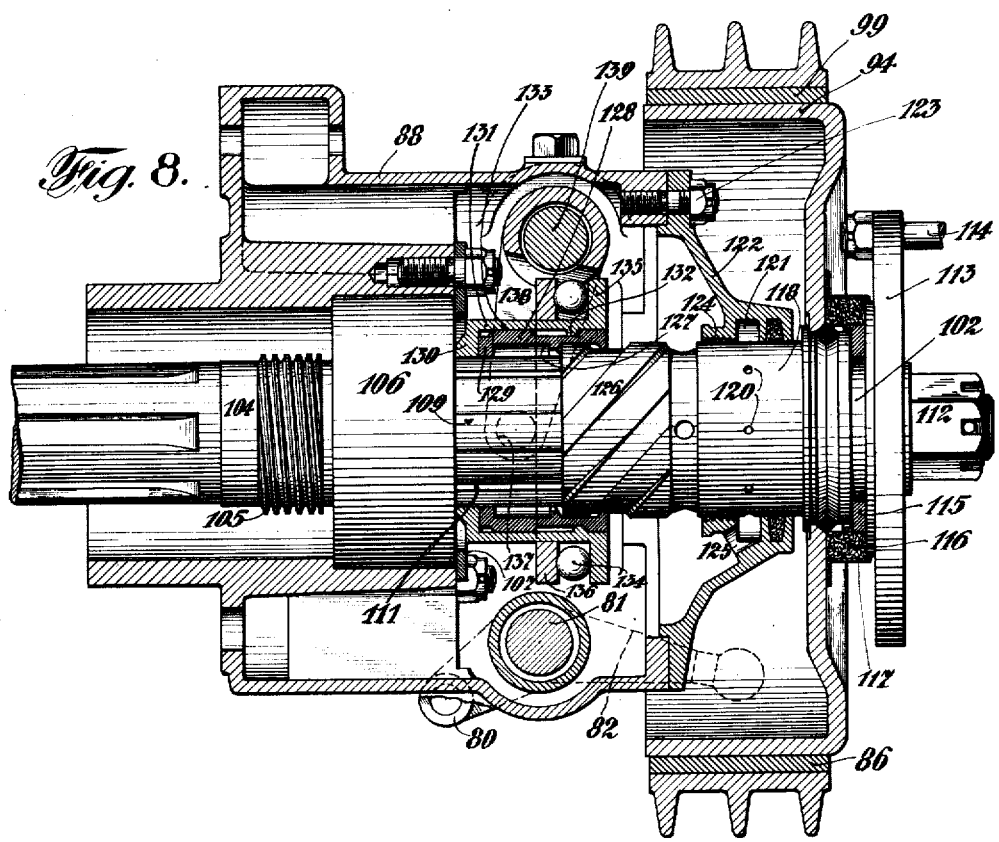

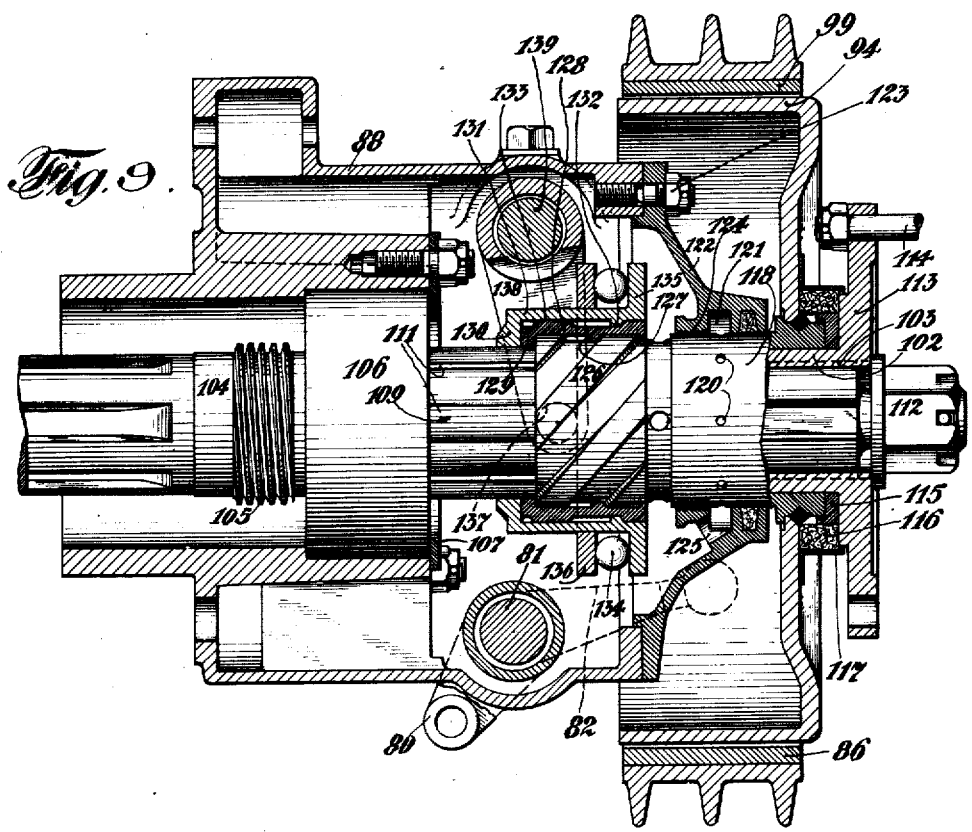

1,948,359

UNITED STATES PATENT OFFICE 1,948,359

MECHANICAL POWER BRAKE

Edward A. Rockwell, Long Island City, N. Y.

Application October 8, 1927. Serial No. 224,846

43 Claims. (Cl. 188—140)

My invention relates to improvements in a mechanical power brake for vehicles and more particularly to a mechanical power brake associated with the propeller shaft of a vehicle for amplifying the pedal pressure of the operator to produce effective actuation of the wheel brakes, the amplification being obtained due to the momentum of the vehicle.

Such improvements as are disclosed in the provision of a single pedal for alternatively actuating the brakes or the accelerator of the engine are covered by claims in my co-pending application, Serial No. 224,847, filed October 8, 1927, and renewed February 25, 1929.

It has been heretofore proposed to amplify the foot pressure applied to the usual brake pedal of a vehicle through force obtained from a driven part of the vehicle, such as by providing a driving clutch member continuously rotatable during movement of the vehicle, such as by association with a counter-shaft driven from the propeller shaft of a vehicle, and to engage a normally stationary clutch member with the rotatable clutch member through pressure applied to the brake pedal, the normally stationary clutch member being suitably connected for actuation of the wheel brakes upon rotation.

It is an object of the present invention to disclose an improved design of a power brake mechanism according to which a braking element, which may be termed a normally rotatable but retardable braking element, is associated with the propeller shaft whereby the braking element is yieldably or impositively driven from the propeller shaft through relatively displaceable spirally threaded members and in which the braking element is retarded through movement of the brake pedal whereupon the displacement of the spirally threaded members transmit, through suitable output means, an amplified braking force to the four-wheel brakes of the vehicle.

It is an object of my invention to obtain a smoother and more even braking action even upon application of the brakes during high speeds of the vehicle, since the braking action is obtained by the retardation of a braking element that is normally rotatable in accordance with the speed of the vehicle, whereas in prior constructions, the braking action is obtained by rotating a normally stationary clutch member through contact with a driving member incapable of retardation relative to the speed of the vehicle.

It is a further object of my invention to disclose a power brake unit that can be conveniently assembled substantially concentric with the propeller shaft of a vehicle and immediately in rear of the transmission casing.

Further advantages of the invention will appear from the following detail description of the same.

While my invention is capable of embodiment in many different forms, for the purpose of illustration I have shown only one preferred form in the accompanying drawings, in which Figure 1 is a diagrammatic plan view of the construction having the several parts of the mechanism mounted upon the chassis of the vehicle.

Figure 2 is a side elevation of the construction shown in Figure 1, being also largely diagrammatic.

Figure 3 is a vertical, longitudinal section of part of the chassis showing a primary brake and foot pedal control.

Figure 4 is a rear elevation of the primary brake in neutral position.

Figure 5 is a side elevation of a portion of the same.

Figure 6 is a vertical, longitudinal section through the same, shown in the rearward braking position.

Figure 7 is a vertical, transverse section through the same but in a neutral position.

Figure 8 is a section showing the position of the parts of the brake in the forward braking position, and Figure 9 is a section of the parts of the brake in the neutral or released position.

In the drawings which show a preferred embodiment of my invention, there is shown a chassis, 30, having front wheels, 31, and rear wheels, 32. The chassis carries an internal combustion engine indicated diagrammatically at 34, which may be of any desired type, having all the usual elements, including a carburetor and a throttle valve, 35, for controlling the carburetor. The throttle valve, 35, is mounted on a shaft, 36, for which there is provided a journal bearing, 37, having a stop shoulder, 38, co-operating with a complementary stop member, 39, on shaft 40, co-axial with the shaft, 36, a certain amount of play in rotary direction being provided between said stop shoulder and complementary stop at a predetermined position of the throttle valve. The shaft, 40, is operated by an arm, 41, connected by a link, 42, to a lever arm, 43, which is normally held downwardly by a spring, 44, secured at one end to the engine body. The arm, 43, is fast on a shaft, 45, carried by journal bearings, 46 and 47, also mounted on the engine body. At the opposite end of the shaft, 45, from that which carries the lever arm, 43, there is an arm, 48, for operating the throttle, 35, for acceleration by swinging from the full line position in Figure 3 to the dotted line position at which it is stopped by a stop, 48ᵃ. This lever arm is approximately U-shaped, and has its end remote from the shaft, 45, connected by a pivot, 49, to the forward end of a foot pedal, 50, which is supported above a floor board, 51, of the automobile. The pedal, 50, as hereinafter described, has near the heel end a pivot, 64, connected to a link, 65. This link, 65, passes through a slot, 68, in a housing, 66, which is supported from the engine transmission casing, 67. A spring, 69, is provided to hold the link, 65, against one side of the slot to prevent rattling.

The lever arm 55 is secured to the shaft 45, the lower end of the lever arm 55 being connected by a pin and slot with the link 57. The link 57 is pivoted at 58 to an arm secured to shaft 59 which carries the gear segment 60. The segment 60 meshes with the gear 61 carried by the throttle operating rod 62 which extends down through the steering column (not shown) in the usual manner.

In order to provide a tight joint between the floor board, 51, and the link, 65, I have provided a rubber or fibre disc, 70, having thereon a coil spring, 71, which is carried in a housing, 72. As described, the other end of the foot pedal, 50, has a pivot, 64, for connection with one end of the link, 65, the other end of which is pivoted to the end of the lever arm, 73, the link 65 being also pivotally connected by a link, 74, with the lever, 48.

The lever arm, 73, is supported on a pivot, 75, on a bracket, 76, which is secured to the engine; and is connected by a link, 77, slotted at 78 for said connection to a lever arm, 80, on a rock shaft, 81, which is journalled in the casing, 88, of the primary or power brake. A stretched spring, 79, secured at one end to the transmission housing, and at the other end connected to the link, 77, near its slotted connection to the lever, 73, re-acts for holding the link, 77, normally thrust rearwardly to position the pivot of the lever, 73, at the forward end of the slot, 78, to provide the range of lost motion which is the purpose of the slot, as hereinafter explained.

Secured to the shaft, 81, there is another lever arm, 82, having universal joint connection to a link, 83, the other end of which is connected by a universal joint to a lever 84 carried by brake shoe, 86. The arm 82, and the link, 83, are shown in Figures 1 and 2 on the other side of the brake drum, 94, from that at which they are, in fact, located, as seen more clearly in the other figures, Figures 1 and 2 being in this respect diagrammatic because the construction would not be readily traced with said parts shown in their true position at the opposite side of the drum.

The brake shoe, 86, is pivotally supported on a stub shaft, 87, carried in the brake housing, 88. An adjusting screw, 89, having a lock nut, 90, is carried by a bracket, 91, on the housing, 88. Said bracket, 91, also supports an arm, 92, which is secured to the bracket by the screw, 89, and the nut, 90, and to which there is attached a spring, 93, which is secured at its opposite end to the pivot, 85, for holding the brake shoe, 86, normally against the stop, 89, and spaced the proper distance away from the brake drum, 94.

On the lever, 84, there is a swivel connection, 95, for receiving one end of an adjusting bolt, 96, which is provided with an adjusting nut, 97, the other end of the bolt being connected to a pivot, 98, on a brake shoe, 99, which is carried by a pivot, 100, on the brake housing. A spring, 101, on the bolt, 96, tends to keep the two brake shoes, 86 and 99, normally held apart the distance permitted by the adjustment of the screw, 89, and the nut, 97. For effective operation in connection with the slower speeds of the car, it is preferable to have the brake shoe, 99, adjusted a little more closely to the drum than the brake shoe, 86.

By the operation of the pedal, 50, through the connections described for rocking the shaft, 81, to close the shoes, 86 and 99, a drag is applied to the outside of the drum, 94, which is rotatably carried upon the outside of the sleeve, 102, having splines, 103, securing said sleeve to a power transmission shaft, 104, of the vehicle mechanism.

The transmission shaft, 104, has on it the usual speedometer drive worm, 105; and rearward of said worm there is provided a journal bearing, 106, which also operates as a thrust bearing, said bearing being retained in place by a ring, 107, and nuts, 108, supported from the brake housing, 88. A spacing sleeve, 109, is carried by the shaft, 104, on splines, 110, and is also provided with external splines, 111, for the purpose hereinafter described. The rearward end of the spacing sleeve, 109, rests against the forward end of the sleeve, 102; and all these parts just described are held in place on the shaft, 104, by means of a nut, 112.

The sleeve, 102, as seen in Figure 6, is provided with a flange, 113, adapted to be connected by bolts, 114, to the adjacent end of the power transmission line leading to the differential. Adjacent to the forward face of the flange, 113, and between the same and the rear end of the sleeve, 118, which constitutes the hub of the brake drum, 94, there is located a bronze washer, 115, to reduce to a minimum the friction on the rear end of the sleeve and on said flange, 113, resulting from the relative rotation between the sleeve, 102, and the drum as hereinafter described.

Also a packing, 116, with a retainer ring, 117, is secured to the face of the drum, 94, to retain lubricant for further reducing the friction. The sleeve hub, 118, of the drum serves to journal the drum on the sleeve, 102, said sleeve hub, 118, of the drum being interiorly counter-bored as seen at 119, and having a plurality of oil holes, 120, to permit the circulation of the oil from the space, 119, outwardly by centrifugal action, so as to communicate with an annular space, 121, in an end plate member, 122, which is attached by screws, 123, to the casing, 88. The inner face of the end plate, 122, has a left-hand screw thread, 124, tending to force the lubricant, with which it may be understood the casing, 88, is supplied, toward the space, 121, from which the lubricant is ultimately discharged back into the cavity of the casing through an opening, 125. The end plate 122, as clearly shown in Figure 6 is provided with an annular groove rearwardly of the space 121 for receiving packing 180 which prevents passage of the lubricant outwardly from the casing 88 and into the interior of the brake drum 94. The outside of the sleeve hub, 118, of the drum, 94, has exteriorly a left-hand spiral, 126, which meshes with a corresponding spiral, 127, on the inside of a sleeve, 128, which is laterally movable with respect to the drum, and which has at its forward end a stop flange, 129, against whose rearward face the end of the sleeve, 118, is stopped, said sleeve, 128, being stopped at its forward end by a flange, 130, on a brake-operating sleeve, 131. This sleeve, 131, has an interior right-hand spiral, 132, cooperating with an exterior right-hand spiral, 133, of the laterally movable sleeve, 128; and the flange, 130, of said sleeve, 131, is engaged by the splines, 111, of the spacing sleeve, 109, which, as already described, has spline and groove engagement with the shaft, 104, so that the sleeve, 131, rotates with said shaft.

From the foregoing description it may be understood that the normal relative positions of the sleeves, 118, 128 and 131, when the shaft, 104, is being rotated for driving the vehicle free from any operation of the brake, is as seen in Figure 9, the right-hand spirals of the sleeves, 118 and 128, and the left-hand spirals of said sleeve, 128, and sleeve, 131, being both at the limit of their respective engagements, that is to say, the sleeve, 131, being at the rearward limit of its range of sliding movement along the shaft, and the sleeve, 128, being at the forward limit of the engagement of its right hand spiral with the right hand spiral of the sleeve, 118; and it will also be understood that upon the operation of the pedal, 50, by pressure applied on the heel end, the brake shoes, 86 and 99, being clamped on the drum, 94, tending to retard its rotation relatively to the shaft, 104, the cooperation of the spirals of the sleeves, 118, 128 and 131, will cause the sleeve, 131, to be thrust forwardly along the shaft, 104, while said sleeve continues to be rotated by said shaft. And it will be seen that this thrust will occur in the same direction, forwardly in whichever direction the shaft, 104, is rotating, whether for forward or rearward running of the vehicle, because the rotation relative to the shaft of the drum and its sleeve hub, 118, in one direction will cause the cooperation of the right hand spirals of the sleeve hub, 118, and the sleeve, 128, to feed the latter sleeve forwardly, while said sleeve is at the limit in the sleeve, 131, of the engagement of the left hand spirals of said sleeves, 128 and 131, so that said forward thrust of the sleeve, 128, will carry the sleeve, 131, forwardly along the shaft. And if the rotation of the shaft, 104, is in the opposite direction for rearward driving, the sleeve, 128, being at the forward limit in the sleeve, 131, of the engagement of the right hand spirals of said sleeves, said reverse rotation will cause the left hand spirals of the sleeves, 128 and 131, to thrust the sleeve, 131, forwardly with respect to said sleeve, 128, to the limit of the cooperation of said sleeves in that direction.

On the outside of the brake-operating sleeve, 131, cooperating with an exteriorly projecting flange, 135, at the rear end of said sleeve, there is provided a thrust bearing for the sleeve, 131, consisting of a ring, 136, stopped against and operated by two pins, 137, on a brake-operating yoke, 138, hereinafter more particularly described, a series of anti-friction balls, 134, being interposed between said ring, 136, and said exteriorly projecting flange, 135. The yoke, 138, is keyed to a shaft, 139, journalled in the casing, 88, one end of said shaft, 139, having a nut, 140, thereon, and the other end having a brake-operating lever, 141.

The brake-operating lever, 141, has attached to it a spring, 142, the other end of which is connected to a bracket, 143, secured to the chassis, said spring operating to keep the yoke, 138, pressed against the ring, 136.

Said lever, 141, has a link, 144, connecting it to a lever, 145, which is pivotally carried on a shaft, 146, journalled on the chassis.

The lever, 145, is connected by a rearwardly extending brake-operating rod, 147, to one end of the lever, 148, for equalizing the front and rear brakes, for which purpose it has its opposite end connected by a rod, 151, with an equalizing link, 152, hereinafter referred to, and is connected at its middle point by a link, 149, to the middle point of an equalizing link, 50, whose opposite ends are pivotally connected respectively to the downwardly extending lever arms, 153 and 154, of rock shafts, 155 and 156, respectively, which are connected for actuation of the rear brakes on rear brake drums 157. Similarly, the link, 152, is arranged to operate the front brakes on drums, 163, on the front wheels 31, through the aid of levers, 164, links, 165, and levers, 166.

It will be understood that the usual emergency hand brake lever, indicated at 167, or any other type of emergency brake control may be provided. In the construction shown, this lever, 167, is adapted to operate a separate set of brakes by means of a link, 168, leading to a lever arm, 169, of a rock shaft, 170, provided with a lever, 171, links, 172 being extended from the lever arms, 169 and 171, to levers, 173, for operating brakes on the interior of the drums, 157, in case the other brakes are located on the outside of said drums.

It will be understood that the brake linkage and other throttle connections are brought into operation by movement of the pedal, 50. As will be seen from Figure 3, the operation of this pedal, 50, is such as to cause the accelerator or throttle to be operated only when the pivot, 64, is acting as a fixed pivot due to the downward pressure upon the forward end of the pedal, as by the toe of the operator's shoe. After such action, the brake can be brought into operation only by first bringing the pedal back to its initial position, restoring the accelerator to its initial position, the pedal being then in position such that the pivot, 49, acts as a fixed pivot, permitting the downward pressure of the foot at the heel to depress the pivot, 64, and attached parts. It will be understood, therefore, that the accelerator and the brake cannot be operated at the same time. This is accomplished in an advantageous manner largely due to the presence of the link, 74, which alternatively acts as a member of a toggle, either with the lever, 48, or with the lever, 73.

Repeating in part the foregoing description, the braking action may be more particularly described. When the primary or mechanical power brake is to be brought into operation, due to the depression by the heel, the downward movement of the link, 65, causes the link, 77, to be drawn forwardly and the lever, 82, to be moved in the same direction. This, through the agency of the lever, 84, causes a drag to be placed upon the drum, 94, so as to slow down the same relatively to the movement of the shaft, 104. Prior to the application of the primary brake or mechanical power brake unit by putting the drag on the drum, 94, the parts will be in neutral or released position, as shown in Figure 9. As soon as the braking action is applied in this manner, however, assuming that the car is moving rearwardly, the outside spiral, 133, on the sleeve, 128, and the inside spiral, 132, on the sleeve, 131, will come into action, as shown in Figure 6, moving the yoke, 138, forwardly so as to operate the connecting linkage and so as to bring all four wheel brakes into action. As soon as the foot pressure is released from the pedal, 50, the springs attached to the braking system, and particularly the spring, 142, and the springs associated directly with the brakes on the four wheels of the car, will be brought into action to bring the sleeve, 131, back into its normal neutral position, as shown in Figure 9. Similarly, should the primary brake be brought into action by the downward movement of the pedal when the car is moving forwardly, the parts will tend to move towards the position shown in Figure 8 by the relative movement between the outside spiral on the sleeve, 118, and the inside spiral on the sleeve, 128. Again, when the foot is released from the pedal, 50, the parts will be moved back into the neutral position, as shown in Figure 9, in the manner already described. However, it will be understood, at any time, when desired, the emergency brake lever, 167, can be operated.

Considering the foregoing description, it will be recognized that the mechanism is adapted to enable the operator to obtain braking action for bringing the vehicle to rest gradually or rapidly as desired,—that is, for halting it after longer or shorter distance travelled while applying the brake, by corresponding gradual or rapid application of foot pressure on the pedal, for the reason that the pressure applied by the pedal to the brake shoes, 86 and 99, to cause them to grip drum, 94, will determine the amount of rotative movement of the shaft, 104, which will occur before the maximum retardment of the drum relative to the shaft will be effected; and that the rate of increase of pressure on the wheel brakes produced by the movement communicated thereto from the lateral movement of the sleeve, 131, operating the rock shaft, 139, corresponding absolutely to the rate at which the drum, 94, is retarded relative to the shaft, will therefore correspond absolutely to the rate at which pressure is applied to the pedal; and this is an important purpose of the invention.

While I have described my invention above in detail, I wish it to be understood that many changes may be made therein without departing from the spirit of the same.

I claim:

1. In combination with a motor vehicle having a propeller shaft, power braking means associated with said propeller shaft comprising a braking element mounted concentric with said propeller shaft, drive transmitting means normally rotating said element as a unit with said shaft, said braking element being retardable for a limited amount with respect to said shaft, operator-controlled means for retarding said braking element and means operated by the relative rotation between said braking element and said propeller shaft for actuating wheel brakes of the vehicle.

2. In combination with a motor vehicle having a propeller shaft, power braking means associated with said propeller shaft comprising a braking element mounted concentric with said propeller shaft, drive transmitting means normally rotating said element as a unit with said shaft, said braking element being retardable for a limited amount with respect to said shaft in either direction of rotation, operator-controlled means for retarding said braking element and means operated by the relative rotation between said braking element and said propeller shaft for actuating wheel brakes of the vehicle.

3. In combination with a motor vehicle having a propeller shaft, power braking means associated with said propeller shaft comprising a braking element mounted concentric with said propeller shaft retained against axial movement with respect to said shaft, drive transmitting means normally rotating said element as a unit with said shaft, said braking element being retardable for a limited amount with respect to said shaft, operator-controlled means for retarding said braking element and means operated by the relative rotation between said braking element and said propeller shaft for actuating wheel brakes of the vehicle.

4. In combination with a motor vehicle having a propeller shaft, power braking means associated with said propeller shaft comprising a braking element mounted concentric with said propeller shaft retained against axial movement with respect to said shaft, drive transmitting means normally rotating said element as a unit with said shaft, said braking element being retardable for a limited amount with respect to said shaft in either direction of rotation, operator-controlled means for retarding said braking element, and means operated by the relative rotation between said braking element and said propeller shaft for actuating wheel brakes of the vehicle.

5. In combination with a motor vehicle having a propeller shaft, power braking means associated with said propeller shaft comprising a braking element mounted concentric with said propeller shaft, drive transmitting means comprising spiral thread connections normally rotating said element as a unit with said shaft, said braking element being retardable for a limited amount with respect to said shaft, operator-controlled means for retarding said braking element and means operated by the relative rotation between said braking element and said propeller shaft for actuating wheel brakes of the vehicle.

6. In combination with a motor vehicle having a propeller shaft, power braking means associated with said propeller shaft comprising a braking element mounted concentric with said propeller shaft, drive transmitting means comprising spiral thread connections normally rotating said element as a unit with said shaft, said braking element being retardable for a limited amount with respect to said shaft in either direction of rotation, operator-controlled means for retarding said braking element and means operated by the relative rotation between said braking element and said propeller shaft for actuating wheel brakes of the vehicle.

7. In combination with a motor vehicle having a propeller shaft, power braking means associated with said propeller shaft comprising a braking element mounted concentric with said propeller shaft retained against axial movement with respect to said shaft, drive transmitting means comprising spiral thread connections normally rotating said element as a unit with said shaft, said braking element being retardable for a limited amount with respect to said shaft in either direction of rotation, operator-controlled means for retarding said braking element and means operated by the relative rotation between said braking element and said propeller shaft for actuating wheel brakes of the vehicle.

8. In combination with a motor vehicle having a propeller shaft, a power brake unit associated with said propeller shaft comprising a braking element mounted concentric with said propeller shaft, drive transmitting means normally rotating said element as a unit with said shaft, said means including a sleeve keyed to said shaft capable of axial movement relative to said shaft, said braking element being retardable with respect to said shaft, whereby said sleeve is axially displaced, operator-controlled means for retarding said braking element and means operated by the axial displacement of said sleeve for actuating the wheel brakes of the vehicle.

9. In combination with a motor vehicle having a propeller shaft, power braking means associated with said propeller shaft comprising a braking element mounted concentric with said propeller shaft, drive transmitting means normally rotating said element as a unit with said shaft, said means including a sleeve keyed to said shaft for axial displacement relative thereto, spiral thread connections between said sleeve and said braking element, said braking element being retardable for a limited amount with respect to said shaft, operator-controlled means for retarding said braking element and means operated by the relative rotation between said braking element and said propeller shaft for actuating wheel brakes of the vehicle.

10. In combination with a motor vehicle having a propeller shaft, power braking means associated with said propeller shaft comprising a braking element mounted concentric with said propeller shaft, drive transmitting means normally rotating said element as a unit with said shaft, said means comprising a sleeve keyed to said shaft for axial displacement relative thereto, spiral thread connections between said sleeve and said braking element, said braking element being retardable for a limited amount with respect to said shaft in either direction of rotation, operator-controlled means for retarding said braking element and means operated by the relative rotation between said braking element and said propeller shaft for actuating wheel brakes of the vehicle.

11. In combination with a motor vehicle having a propeller shaft, a power brake unit associated with said propeller shaft comprising a braking element mounted concentric with said propeller shaft and retained against axial displacement relative thereto, drive transmitting means normally rotating said element as a unit with said shaft, said means including a sleeve keyed to said shaft capable of axial movement relative to said shaft, said braking element being retardable with respect to said shaft, whereby said sleeve is axially displaced, operator-controlled means for retarding said braking element and means operated by the axial displacement of said sleeve for actuating the wheel brakes of the vehicle.

12. In combination with a motor vehicle having a propeller shaft, power braking means associated with said propeller shaft comprising a braking element mounted concentric with said propeller shaft, drive transmitting means normally rotating said braking element as a unit with said shaft, said means comprising a sleeve keyed to said shaft for axial displacement relative to said braking element, an intermediate sleeve between said keyed sleeve and said braking element, said intermediate sleeve being coupled to said braking element through one set of spiral threads and coupled to said keyed sleeve through an oppositely arranged set of spiral threads, said braking element being retardable for a limited amount with respect to said shaft in either direction of rotation, whereby said keyed sleeve is axially displaced through the action of the spiral thread connections, operator-controlled means for retarding said braking element and means operated by the axial displacement of said keyed sleeve for actuating wheel brakes of the vehicle.

13. In combination with a motor vehicle having a propeller shaft rearwardly extending from the transmission, braking means for the vehicle wheels, a brake element mounted concentric with the propeller shaft in rear of the transmission, said brake element being normally rotatable with said propeller shaft but retardable for a limited amount with respect to said shaft in either direction of its rotation, operator-controlled means for retarding said drum and means for applying said wheel braking means by the relative movement between said brake element and said propeller shaft.

14. In combination with a motor vehicle having a propeller shaft rearwardly extending from the transmission, wheel braking means, a power brake including an impositively driven brake element concentric with said shaft adjacent the transmission, operator-controller means for bringing said power brake into action and connections for actuating the wheel braking means through operation of said power brake.

15. In combination with a motor vehicle having a propeller shaft for driving the vehicle, a brake element concentric with said propeller shaft yieldingly driven therefrom in either direction of rotation, operator-controlled means for retarding the rotation of said brake element, braking means for all four wheels of the vehicle and connections to actuate the wheel brakes by a relative rotation between said brake element and said shaft.

16. In combination with a motor vehicle having a propeller shaft for driving the vehicle, braking means associated with the vehicle wheels, means for applying said braking means by utilizing the vehicle momentum comprising a brake element concentrically mounted with respect to the propeller shaft normally rotatable with said propeller shaft but free to have a limited relative rotation with respect to said propeller shaft, said braking element being retained against axial displacement with respect to said shaft, operator-controlled means for retarding the rotation of said brake element and connections to said wheel braking means, actuated by a relative rotation between said brake element and said shaft.

17. In a power brake construction a drive shaft, a drive sleeve keyed thereto and a brake element mounted on said sleeve free to have a limited rotation relative to said drive sleeve and said shaft.

18. In a power brake construction a drive shaft, a drive sleeve keyed thereto and a brake drum mounted on said sleeve free to have a limited rotation relative to said sleeve and said shaft and oil sealing means between said drum and said sleeve.

19. In a power brake construction a drive shaft, a flanged drive sleeve keyed to the end of said drive shaft, a flanged brake drum mounted on said drive sleeve free to have a limited rotation relative to said drive sleeve and said shaft and oil sealing means between the flanges of said drive sleeve and said brake drum.

20. In a power brake construction a drive shaft, a drive sleeve keyed to the end of said shaft, a brake drum mounted on said sleeve free to have a limited rotation relative to said drive sleeve and said shaft, said brake drum including a hub extending away from the end of said shaft, a fixed casing surrounding the hub of said brake drum, oil sealing means between said casing and the hub of said brake drum and oil sealing means on the opposite side of said brake drum between said brake drum and said drive sleeve.

21. In a power brake construction for motor vehicles a drive shaft rearwardly extending from the transmission, a drive sleeve keyed to the end of said shaft and having a forwardly extending hub, a brake drum mounted on said drive sleeve free to have a limited rotation relative to said drive sleeve and said shaft, said brake drum including a hub extending forwardly of said shaft, a fixed housing enclosing said driving shaft and the hub of said brake drum having a rearwardly facing opening for purposes of assembly and a cover plate adapted to be fixed to said housing to close said opening, said cover plate extending into sealing engagement with the hub of said brake drum.

22. In a power brake construction a shaft, a brake element mounted concentric with said shaft, an actuating sleeve keyed for axial movement with respect to said shaft, an intermediate sleeve between said actuating sleeve and said brake element, said intermediate sleeve being coupled to said brake element and said actuating sleeve through oppositely inclined surfaces, operator-controlled means causing said brake element to be retarded relative to the actuating sleeve, whereby said actuating sleeve is displaced axially and output connections actuated by the displacement of said sleeve, the provision of the intermediate sleeve causing said axial displacement of said actuating sleeve in the same direction, regardless of the direction in which the brake element is turned.

23. In a power brake construction a drive shaft, a pair of outer and inner sleeves, one of said sleeves being stopped against axial displacement, the other of said sleeves being keyed to said shaft and capable of axial displacement relative thereto, and intermediate sleeve coupled to said outer and inner sleeves through oppositely inclined surfaces, means for retarding the rotation of said stopped sleeve whereby said keyed sleeve is displaced in the same direction, regardless of its direction of rotation, and output connections moved by the displaceable sleeve.

24. In a power brake construction a drive shaft, a pair of inner and outer sleeves, one of said sleeves being stopped against axial displacement, the other of said sleeves being keyed to said shaft for rotative movement therewith and capable of axial displacement relative thereto, an intermediate sleeve, spiral thread connections between the intermediate sleeve and the inner sleeve and oppositely spiralled thread connections between the intermediate sleeve and the outer sleeve, means for retarding the rotation of said stopped sleeve, whereby said keyed sleeve is displaced in the same direction, regardless of its direction of rotation, and connections moved by the displacement of the sleeve.

25. In a power brake construction a drive shaft, a brake element mounted on said shaft for rotation with said shaft and an axially displaceable sleeve keyed to rotate with said shaft, spiral thread connections between said sleeve and said brake element, means for retarding the rotation of said brake element and output connections moved by the displacement of said sleeve.

26. In a power brake construction a drive shaft, a brake element mounted on said shaft free to have a limited rotative movement relative to said shaft, a hub unitary with said brake element, an axially displaceable sleeve keyed to rotate with said shaft, spiral thread connections between said sleeve and said hub, a yoke member having its arms in thrust engagement with said axially displaceable sleeve, means for retarding the rotation of said brake element and output connections moved by said yoke member through the rotation of said shaft when said brake element is retarded.

27. In a power brake construction a drive shaft, a brake element rotatable relative to said shaft, a hub unitary with said brake element, an axially displaceable sleeve keyed to rotate with said shaft, spiral thread connections between said sleeve and said hub, a thrust bearing carried by said sleeve, an actuating yoke having its arms in thrust engagement with said thrust bearing, means for retarding the rotation of said brake element and output connections moved by the operation of said yoke.

28. In a power brake construction a drive shaft, a brake drum mounted on said shaft, free to have a limited rotative movement relative to said shaft, a hub unitary with said drum, an axially displaceable sleeve keyed to rotate with said shaft, reversible spiral thread drive-transmitting means between said sleeve and the hub of said drum, output connections in thrust engagement with said sleeve, said means normally holding said output connections and said sleeve in operable position, means for retarding the rotation of said brake drum, whereby relative rotation between said brake drum and said drive shaft causes the output connections to be moved against the resistance of said resilient means, said resilient means causing said output connections and sleeve to be returned to normal position upon the release of the retarding force upon the brake drum.

29. A power brake applying device comprising a shaft, a friction member rotatable relative to said shaft, a displaceable sleeve splined for axial movement relative to said shaft, an intermediate member engaging said friction member and said sleeve, means causing the displacement of both said sleeve and said intermediate member when said friction member is rotated in one direction relative to said shaft and means causing the displacement of said sleeve alone in the same axial direction, when said friction member is rotated in the opposite direction relative to said shaft.

30. In a power brake construction, a drive shaft, a brake element, means coupling said brake element to said shaft permitting rotation of said brake element relative to said shaft said means including an axially displaceable sleeve and an intermediate sleeve, means for retarding the rotation of said brake element whereby both said sleeves are displaced in one direction of rotation of said brake element and said first sleeve alone is displaced in the same axial direction when said brake element is retarded in its opposite direction of rotation.

31. A brake operating mechanism including three members oppositely threaded together, means for rotating one of said members from a rotating part, means continuously under the control of the operator for retarding at least one or the other of the remaining threaded members, whereby one of said threaded members is moved longitudinally in a direction to apply the brakes irrespective of the direction of rotation of the rotating part and connections between the moved member and the brakes for applying the brakes.

32. A brake operating mechanism for motor vehicles comprising a shaft driven by the engine, a spirally threaded member driven from said shaft, a second oppositely spiralled member also driven from said shaft, a brake member concentric with said shaft and normally rotatable as a unit with said shaft and said spirally-threaded members, input means for producing frictional retardation of said braking member to thereby cause a relative rotation with respect to said shaft and an axial displacement of at least one of said spirally-threaded members and output means moved by said axial displacement to actuate the wheel brakes of the vehicle independent of the direction of rotation of said shaft.

33. A brake operating mechanism for motor vehicles comprising a shaft driven by the engine, a spirally-threaded member driven from said shaft, a second oppositely spirally-threaded member also driven from said shaft, a braking member concentric with said shaft and driven from said shaft through said spirally-threaded members whereby said shaft and said spirally-threaded members and said braking member normally rotate as a unit, an axially-displaceable thrust bearing mounted concentric with said shaft adapted to be displaced by an axial displacement of one of said spirally-threaded members, input means for producing frictional retardation of said braking member to produce a relative rotation with respect to said shaft and an axial displacement of at least one of said spirally-threaded members independent of the direction of rotation of said shaft, a pivoted output yoke lever in thrust engagement with said thrust bearing and linkage connection from the yoke member to the wheel brakes of the vehicle.

34. In combination, a power shaft, a brake on the power shaft, a brake operating sleeve longitudinally slidable on said shaft, a yoke member actuated by said sleeve, a rock shaft transverse to said power shaft, said yoke member being keyed to said rock shaft, and a brake lever mounted on said rock shaft.

35. In a braking system, a driving member, a driven member normally rotatable at the speed of the driving member but capable of limited relative rotation with respect thereto, braking mechanism, resilient means normally holding said braking mechanism out of action and means for bringing said braking mechanism into action upon a relative rotation of said driven member with respect to said driving member, said resilient means being effective to throw the braking mechanism out of action through energy accumulated upon application of said braking mechanism.

36. In combination with a motor vehicle having a propeller shaft, a power brake unit associated with said propeller shaft comprising an element mounted concentric with said propeller shaft, drive transmitting means including spiral thread connections normally rotating said element as a unit with said shaft, said element being retardable with respect to said shaft in either direction of rotation, operator-controlled input means for retarding said element and output means actuated by the relative rotation between said element and said propeller shaft for operating a control of said vehicle.

37. In combination with a motor vehicle having a propeller shaft, a power unit associated with said propeller shaft, comprising an element mounted concentric with said propeller shaft, drive transmitting means normally rotating said element as a unit with said shaft, said means including a sleeve keyed to said shaft capable of axial movement relative to said shaft, said element being retardable with respect to said shaft whereby said sleeve is axially displaced, operator-controlled input means for retarding said element and output means actuated by the axial displacement of said sleeve for operating a control of said vehicle.

38. In a power unit construction, a drive shaft, an element mounted on said shaft for normal rotation with said shaft, an axially displaceable sleeve keyed to rotate with said shaft, spiral thread connections between said sleeve and said element, input means for retarding the rotation of said element and output means moved by the displacement of said sleeve.

39. A power amplifying unit comprising a drive shaft, a member adapted for frictional engagement and normally rotatable with but retardable with respect to said shaft, a pair of axially displaceable sleeves spirally threaded together and yieldably coupling said member to said shaft, input means for frictionally engaging said member to retard said member in its rotation with respect to said shaft and output means moved by displacement of at least one of said spiral sleeves for transmitting an output actuating force greater than the input force.

40. In combination with a motor vehicle having a drive shaft, power amplifying means associated with said drive shaft, a friction element concentric with said shaft and having a hub, impositive drive-transmitting means normally rotating said element as a unit with said drive shaft, said means including spiral thread coupling means intermediate said shaft and the hub of said element, said element being retardable for a limited amount with respect to said shaft, operator controlled input connections for frictionally retarding the rotation of said element, output connections for operating a control of said vehicle, including a thrust member axially displaced by relative rotation between said element and said shaft and lever means actuated by the movement of said thrust member.

41. In combination with a motor vehicle having a propeller shaft, power amplifying means associated with said propeller shaft comprising a friction element mounted concentric with said shaft, drive transmitting means normally rotating said elements as a unit with said shaft, said means including a sleeve rotatable with said shaft, said element being retardable with respect to said shaft and said sleeve, operator-controlled input means for frictionally retarding said element and output means actuated by the relative axial displacement between said sleeve and said element for operating a control of said vehicle.

42. A power amplifying unit comprising a drive shaft, a member adapted for frictional engagement and normally rotatable with but retardable with respect to said shaft, a pair of relatively displaceable sleeves spirally coupled together and yieldably coupling said member to said shaft, input means for frictionally engaging said member to retard said member in its rotation with respect to said shaft and output means moved by displacement of at least one of said spiral sleeves for transmitting an output actuating force greater than the input force, said output means including a thrust member and lever means actuated by the displacement of said thrust member.

43. In combination with a motor vehicle, a power amplifying unit for operating a control of said vehicle, comprising, a drive shaft, a friction element mounted concentric with said drive shaft, means yieldably coupling said element to said drive shaft for normal rotation therewith but permitting relative rotation therebetween, means preventing axial displacement of said friction member relative to said shaft, operator-controlled input means for producing frictional retardation of said friction member and output lever means for operating a control of said vehicle actuated by the retardation of said friction element relative to said shaft.

EDWARD A. ROCKWELL.

CERTIFICATE OF CORRECTION.

Patent No. 1,948,359.   February 20, 1934.

EDWARD A. ROCKWELL.

It is hereby certified that error appears in the printed specification of the above numbered patent requiring correction as follows: Page 3, line 85, for "50" read 150; page 5, line 91, claim 13, for "drum" read brake element; and page 6, line 106, claim 28, for "said" second occurrence, read resilient; and that the said Letters Patent should be read with these corrections therein that the same may conform to the record of the case in the Patent Office.

Signed and sealed this 15th day of May, A. D. 1934.

Bryan M. Battey (Seal)   Acting Commissioner of Patents.

43. In combination with a motor vehicle, a power amplifying unit for operating a control of said vehicle, comprising, a drive shaft, a friction element mounted concentric with said drive shaft, means yieldably coupling said element to said drive shaft for normal rotation therewith but permitting relative rotation therebetween, means preventing axial displacement of said friction member relative to said shaft, operator-controlled input means for producing frictional retardation of said friction member and output lever means for operating a control of said vehicle actuated by the retardation of said friction element relative to said shaft.

EDWARD A. ROCKWELL.

CERTIFICATE OF CORRECTION.

Patent No. 1,948,359.   February 20, 1934.

EDWARD A. ROCKWELL.

It is hereby certified that error appears in the printed specification of the above numbered patent requiring correction as follows: Page 3, line 85, for "50" read 150; page 5, line 91, claim 13, for "drum" read brake element; and page 6, line 106, claim 28, for "said" second occurrence, read resilient; and that the said Letters Patent should be read with these corrections therein that the same may conform to the record of the case in the Patent Office.

Signed and sealed this 15th day of May, A. D. 1934.

Bryan M. Battey (Seal)   Acting Commissioner of Patents.